(12) United States Patent
Treyes

(10) Patent No.: US 10,531,764 B2
(45) Date of Patent: Jan. 14, 2020

(54) INSULATED SERVING DISH

(71) Applicant: Jill Treyes, San Ramon, CA (US)

(72) Inventor: Jill Treyes, San Ramon, CA (US)

( * ) Notice: Subject to any disclaimer, the term of this patent is extended or adjusted under 35 U.S.C. 154(b) by 169 days.

(21) Appl. No.: 15/405,724

(22) Filed: Jan. 13, 2017

(65) Prior Publication Data
US 2017/0196403 A1 Jul. 13, 2017

Related U.S. Application Data

(60) Provisional application No. 62/278,102, filed on Jan. 13, 2016.

(51) Int. Cl.
*A47G 23/04* (2006.01)
*A47J 36/24* (2006.01)
*A47G 19/30* (2006.01)

(52) U.S. Cl.
CPC .................. *A47J 36/24* (2013.01)

(58) Field of Classification Search
CPC ......... A47J 36/24; A47J 29/02; B65D 25/241; B65D 41/02; B65D 43/16; B65D 25/28; B65D 51/24; B65D 81/38
USPC ................ 220/574, 574.2, 573.4, 573.5, 252
See application file for complete search history.

(56) References Cited

U.S. PATENT DOCUMENTS

| | | | | |
|---|---|---|---|---|
| 71,889 A | * | 12/1867 | Lawrence | B65D 43/00 220/252 |
| 246,720 A | * | 9/1881 | Campbell | A47J 27/10 220/573.5 |
| 434,688 A | * | 8/1890 | Veley | A47J 27/10 220/573.4 |
| 1,741,569 A | * | 12/1929 | Hindman | A47J 36/24 126/33 |
| 2,481,384 A | * | 9/1949 | Blackwell | A47J 39/02 219/439 |
| 2,550,998 A | * | 5/1951 | Hilliker | B65D 7/00 217/57 |
| 4,123,969 A | * | 11/1978 | Abbate | A21C 13/00 126/348 |
| 5,045,672 A | | 9/1991 | Scott | |
| 5,381,729 A | | 1/1995 | Hennessy et al. | |
| D426,103 S | | 6/2000 | Briner | |
| 6,705,210 B2 | | 3/2004 | Leonard | |

(Continued)

*Primary Examiner* — J. Gregory Pickett
*Assistant Examiner* — Niki M Eloshway
(74) *Attorney, Agent, or Firm* — Global Intellectual Property Agency, LLC; Daniel Boudwin

(57) ABSTRACT

An insulated serving dish. The insulated serving dish includes a housing having an interior volume and a container disposed within the housing interior volume such that a channel is formed between the housing sidewalls and container sidewalls. The container receives ice therein for maintaining food at a cold temperature during serving. A support tray is removably received by the container volume above the ice stored therein. A plurality of food trays are then supported by the support tray, such that the interior volume of the food tray is positioned within the interior volume of the container. A lid that selectively encloses the container volume has a lower edge that occupies that channel between the container sidewall and housing sidewalls. The lid may be pivotally affixed to the housing and container such that it may be rotated between a closed position and an open position.

15 Claims, 4 Drawing Sheets

(56) References Cited

U.S. PATENT DOCUMENTS

| | | | | |
|---|---|---|---|---|
| 6,832,492 B1* | 12/2004 | Kunkel | ............... | F25D 3/06 |
| | | | | 62/458 |
| 7,288,745 B2* | 10/2007 | Colonna | ............... | F25D 3/08 |
| | | | | 219/438 |
| 8,225,956 B1* | 7/2012 | LeBlanc | ............... | A47J 43/27 |
| | | | | 206/459.1 |
| 2002/0125245 A1* | 9/2002 | Fuchs | ............... | A47J 27/62 |
| | | | | 219/622 |
| 2003/0218000 A1* | 11/2003 | Haber | ............... | A47J 36/06 |
| | | | | 219/430 |
| 2005/0076795 A1 | 4/2005 | Riddle | | |
| 2012/0247448 A1* | 10/2012 | Thibodeaux | ............ | A47J 37/07 |
| | | | | 126/25 R |

* cited by examiner

INSULATED SERVING DISH

CROSS REFERENCE TO RELATED APPLICATIONS

This application claims the benefit of U.S. Provisional Application No. 62/278,102 filed on Jan. 13, 2016. The above identified patent application is herein incorporated by reference in its entirety to provide continuity of disclosure.

FIELD OF THE INVENTION

The present invention relates to serving dishes. More particularly, the present invention provides an insulated serving dish having a lid removably secured to a container for storing ice and food trays therein.

BACKGROUND OF THE INVENTION

Food is often served from serving dishes at events dinners, parties, receptions, weddings, and the like. Some food needs to be kept at a cold temperature prior to serving. If not kept a low enough temperatures, such foods may become unpalatable. In some cases, the food can become spoiled and cause harm to those that ingest it. While electric coolers may be used to store cold food, electric refrigeration is expensive, and food is not always served near a power source. It is therefore desirable to provide an insulated serving dish that stores ice and food trays for keeping food cold during serving.

Devices have been disclosed in the known art that relate to serving dishes. These include devices that have been patented and published in patent application publications. These devices generally relate to heated serving dishes, such as U.S. Patent Application Publication 2005/0076795, U.S. Pat. Nos. 5,045,672, 6,705,210, 5,381,729, and D426,103.

The devices in the known art have several drawbacks. These devices provide means for heating food but fail to provide an insulated container for keeping food at a cold temperature. Further, these devices fail to provide an insulated serving dish having a pivotally affixed lid that can be moved between a closed position and an open position.

In light of the devices disclosed in the known art, it is submitted that the present invention substantially diverges in design elements from the prior art and consequently it is clear that there is a need in the art for an improvement to existing animal deterring devices. In this regard the present invention substantially fulfills these needs.

SUMMARY OF THE INVENTION

In view of the foregoing disadvantages inherent in the known types of serving dishes now present in the prior art, the present invention provides an insulated serving dish wherein the same can be utilized for providing convenience for the user when storing and serving food at a cold temperature.

The insulated serving dish includes a housing having a plurality of peripheral sidewalls extending vertically therefrom forming an interior volume and a container disposed within the interior volume of the housing, the container including a container base and plurality of container sidewalls extending vertically therefrom forming a container volume. The insulated serving dish further includes a support tray having a plurality of apertures thereon, wherein the support tray is removably received within the container volume, and a food tray including a planar base, a plurality of food tray sidewalls extending therefrom forming a food tray volume, and a flange disposed on an upper edge of the food tray sidewalls, wherein the flange supports the food tray on an upper edge of the container sidewalls such that the food tray volume occupies a portion of the container volume. A channel is formed between the housing peripheral sidewalls and the container sidewalls. The insulated serving dish further includes a lid having opposing semicircular sidewalls and an arcuate upper surface, and an open lower end forming an open half cylinder, wherein a lower edge of the lid selectively occupies the channel formed between the housing peripheral sidewalls and the container sidewalls, wherein the lid is configured to selectively enclose the container volume.

One object of the present invention is to provide a novel and improved insulated serving dish that provides additional advantages over serving dishes in the known art.

Another object of the present invention is to provide an insulated serving dish having a pivotally affixed lid that can be rotated between open and closed positions.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
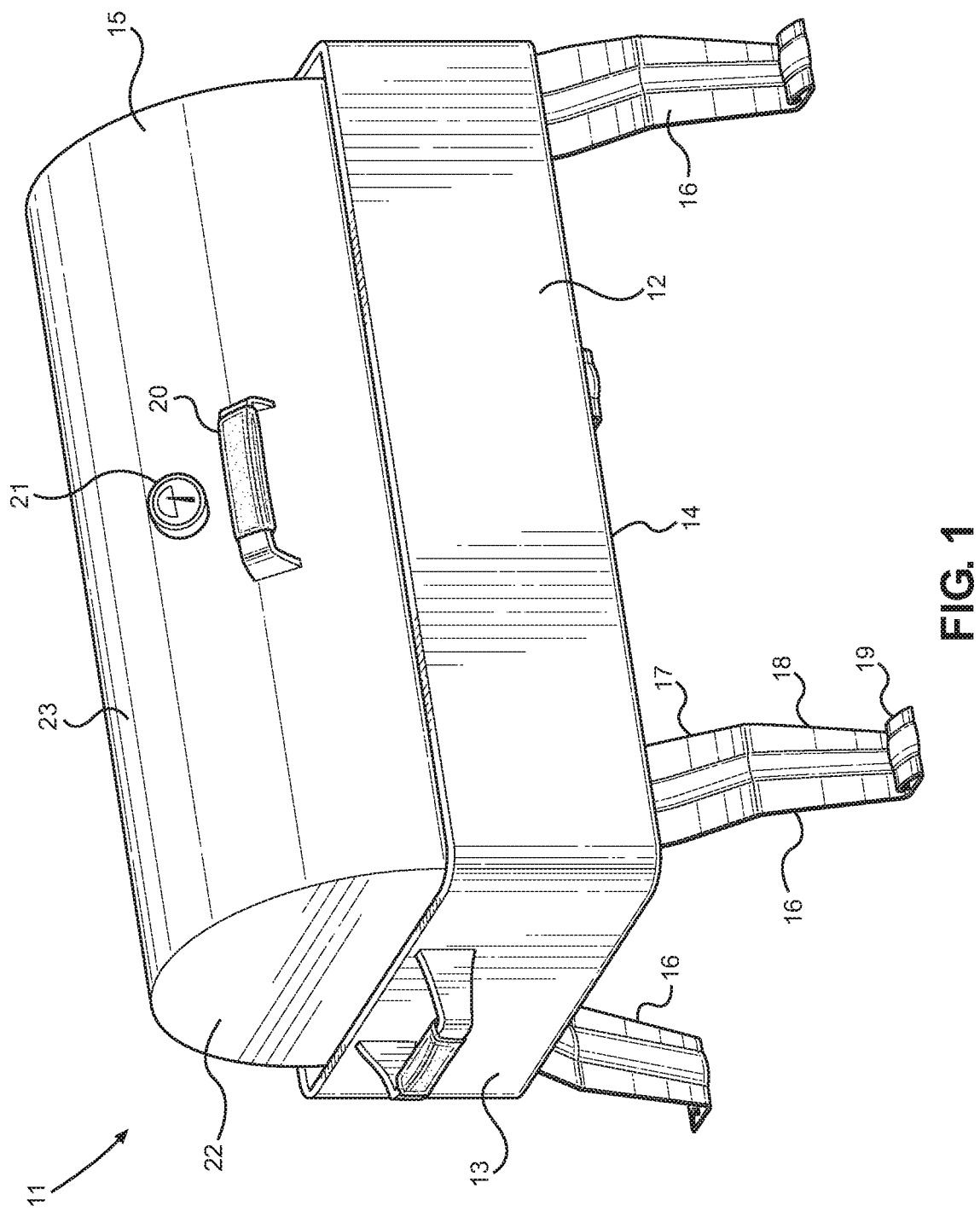
FIG. 1 shows a perspective view of the insulated serving dish with the lid in a closed position.

Reference is made herein to the attached drawings. Like reference numerals are used throughout the drawings to depict like or similar elements of the insulated serving dish. For the purposes of presenting a brief and clear description of the present invention, the preferred embodiment will be discussed as used for storing and serving food at cold temperatures. The figures are intended for representative purposes only and should not be considered to be limiting in any respect.

Referring now to FIG. 1, there is shown a perspective view of the insulated serving dish with the lid in a closed position. The serving dish 11 generally comprises a housing 12 having an underside 14 and sidewalls 13 disposed thereon, the sidewalls 13 extending upward therefrom. The housing 11 encloses an insulated container that stores ice and food therein. The housing 11 preferably has a rectangular perimeter; however, other shapes may be contemplated, such as a square or oval shaped perimeter.

In the shown embodiment, the housing 12 comprises a plurality of legs 16 disposed on the underside 14 thereof. The legs 16 preferably include an upper member 17 forming an obtuse angle with respect to the underside 14 of the housing 12, a lower member 18 extending vertically downward from the upper member 17, and a foot member 19 disposed on the lower member 18, such that the foot member 19 is perpendicular to the lower member 18. This configuration provides stability to the serving dish 11 and effectively supports a serving dish 11 that is filled with both ice and food.

The serving dish 11 further comprises a lid 15 that encloses an upper end of the housing 12. The lid 15 comprises a pair of opposing semicircular sidewalls 22 and an arcuate upper surface 23 extending therebetween. In the shown embodiment, the lid 15 further comprises a temperature gauge 21 thereon, which is configured to measure and display the temperature of the container disposed within the housing 12. The lid 15 further includes a handle 20 on the upper surface 23 thereof to assist individuals in opening and closing the lid 15. In one embodiment, the lid 15 is pivotally affixed to the housing 12. In an alternative embodiment, the lid 15 is detached from the housing 12 and can be lifted upward and removed when an individual accesses the container within the housing 12.

Figure 2:
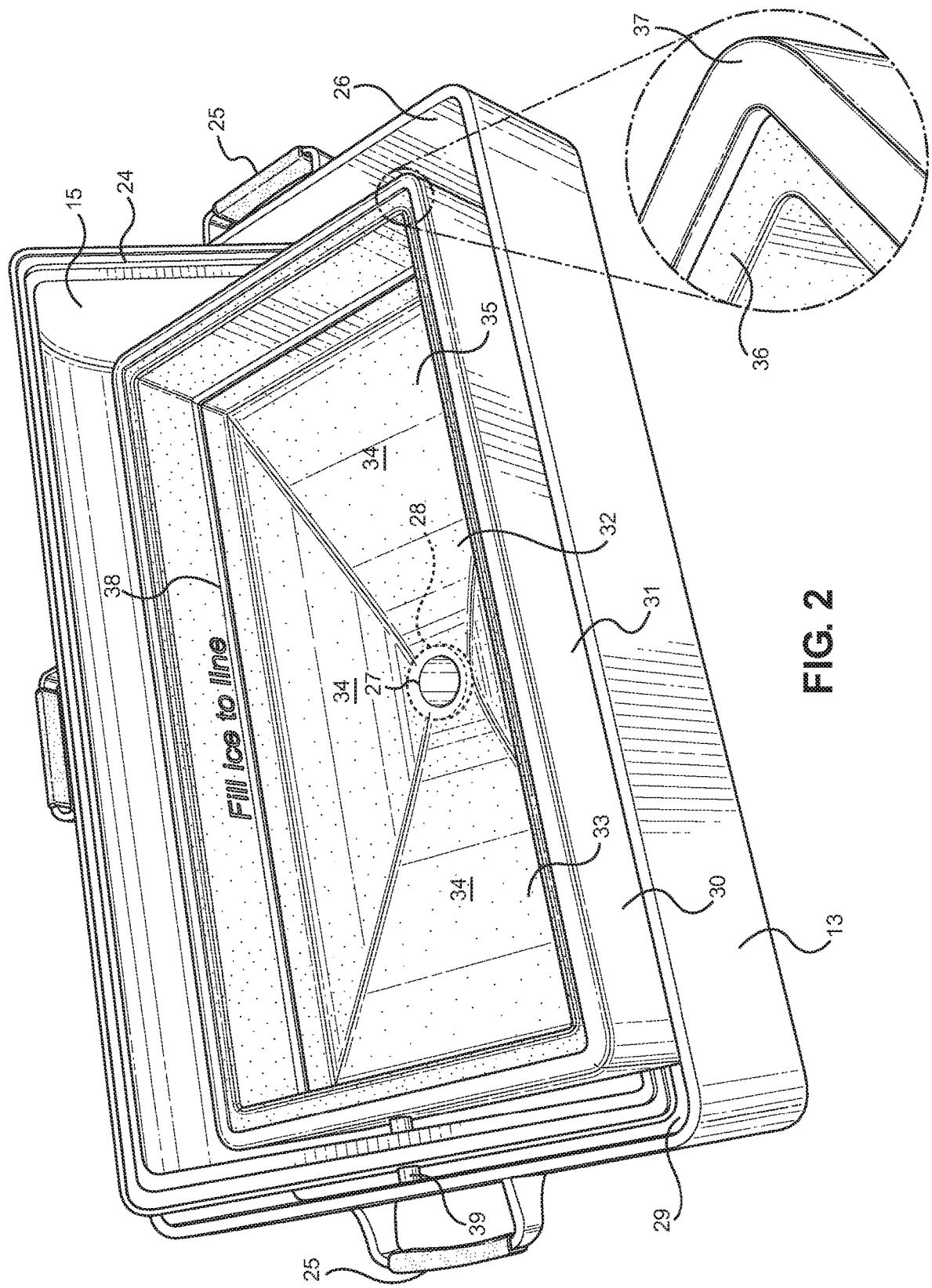
FIG. 2 shows a perspective view of the container portion of the insulated serving dish with the lid in an open position.

Referring now to FIG. 2, there is shown a perspective view of the insulated serving dish with the lid in an open position. The serving dish 11 further comprises a container 30 disposed within an interior volume 26 of the housing 12. The housing may additional comprise handles 25 disposed on opposing sidewalls 13 to assist in movement of the serving dish 11. The container 30 includes a base 35 and sidewalls 31 extending therefrom. The perimeter of the container 30 is preferably shaped the same as the perimeter of the housing 12. A channel 29 having a constant width is formed between the container sidewalls 31 and the housing sidewalls 13. A lower edge 24 of the lid 15 occupies the space within the channel 29.

The container base 35 comprises a plurality of base panels 33 having downward sloping upper surfaces 34. The base panels 33 slope downward and converge at a drain 28 disposed toward the center of the container base 35. A cap is removably secured to the drain 28. When the cap 27 is removed, excess water from melting ice is permitted to exit the container 30 through the drain 28. In this way, the container 30 can be refreshed with fresh ice without having to manually remove water therefrom. The container 30 also includes a fill marker 38 that notifies individuals the proper amount of ice to place in the container volume 32 to ensure optimal cooling.

In the illustrated embodiment, the lid 15 is pivotally affixed to the serving dish 11 via a pivot point 39 that extends between the container sidewalls 31 and the housing sidewalls 13. The lid 15 is configured to rotate between a closed position, as shown in FIG. 1, and an open position, as shown in FIG. 2. In alternate embodiments, the lid 15 is detached from the serving dish 11 and can be selectively removed therefrom in order to provide access to the container 30.

The base 33 and sidewalls 31 of the container 30 comprise an inner layer 36 and an outer layer 37. The inner layer 36 is composed of an insulating material and is adapted to maintain a cool temperature within the container 30. The outer layer is composed of a waterproof material such as plastic or metal and prevents water from leaking from the container sidewalls 31. In this way, all water within the container may only exit via the drain 28.

Figure 3:
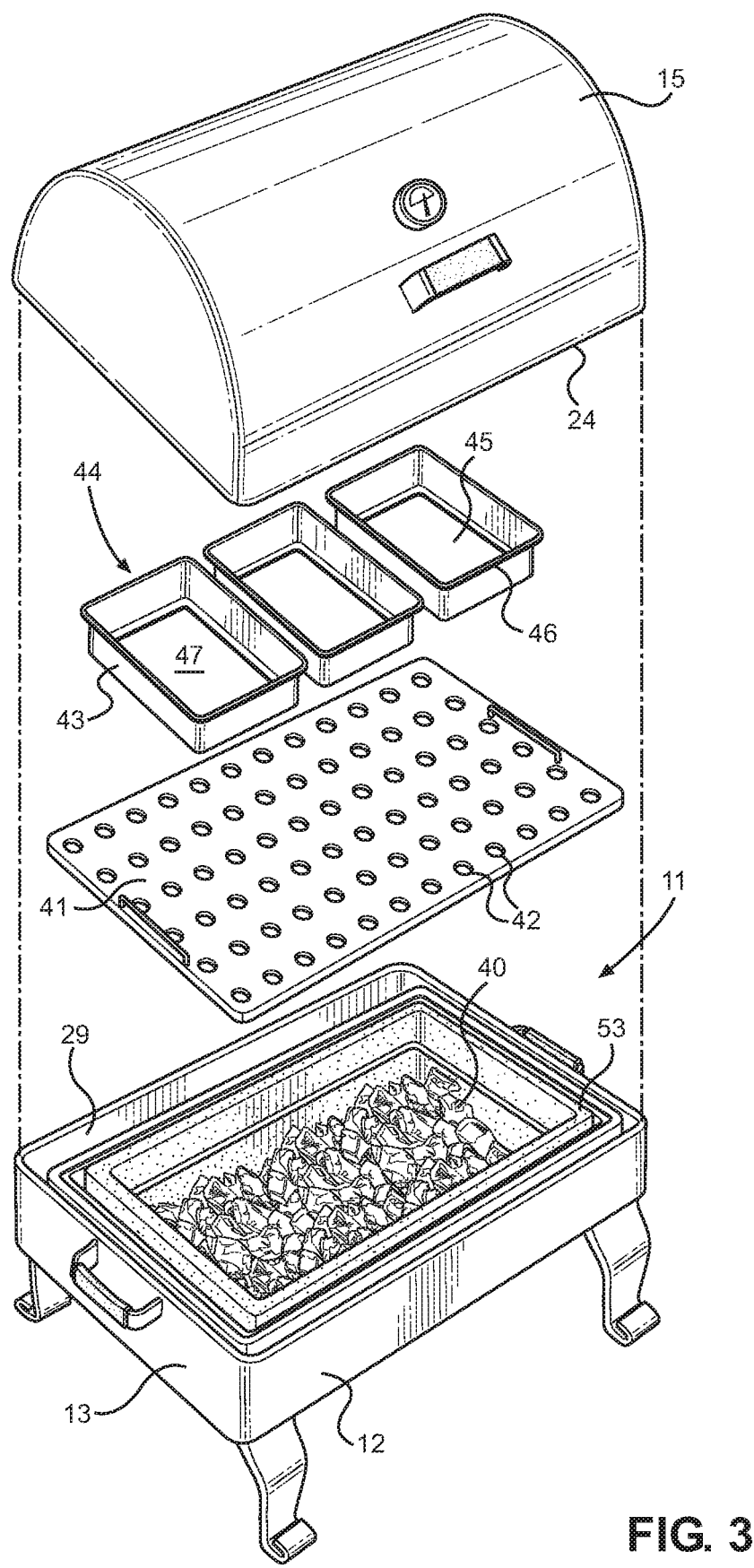
FIG. 3 shows an exploded view of the insulated serving dish.

Referring now to FIG. 3, there is shown an exploded view of the insulated serving dish. In the shown embodiment, the lid 15 is not affixed to the housing 12 so that it is freely removable from the serving dish 11, wherein the lower edge 24 of the lid 15 occupies the channel 29 when placed on the serving dish 11. The container is shown storing ice 40 therein.

A support tray 41 is placed above the ice 40 and rests thereon, or alternatively may rest on a flange disposed within the container volume. The support tray 41 comprises apertures 42 that allow air cooled by the ice 40 to contact food stored in the container 30. In the illustrated embodiment, the apertures 42 are disposed on the support tray 41 such that they are equidistant from one another.

Food trays 43 are placed above the support tray. Each food tray 43 comprises a base 47 and a plurality of sidewalls 44 defining a food tray volume 45 for storing food therein. The food trays 43 further comprise a flange 46 on an upper end of the sidewalls 44. When placed within the container 30, the flange 46 supports the food tray 43 on an upper edge 53 of the container 30, such that the food tray volume 45 occupies space within the container volume. This configuration leaves a space between the support tray 41 and the base 47 of the food tray 43, allowing the cooled air to circulate and cool the food stored within the food tray volume 45.

Figure 4:
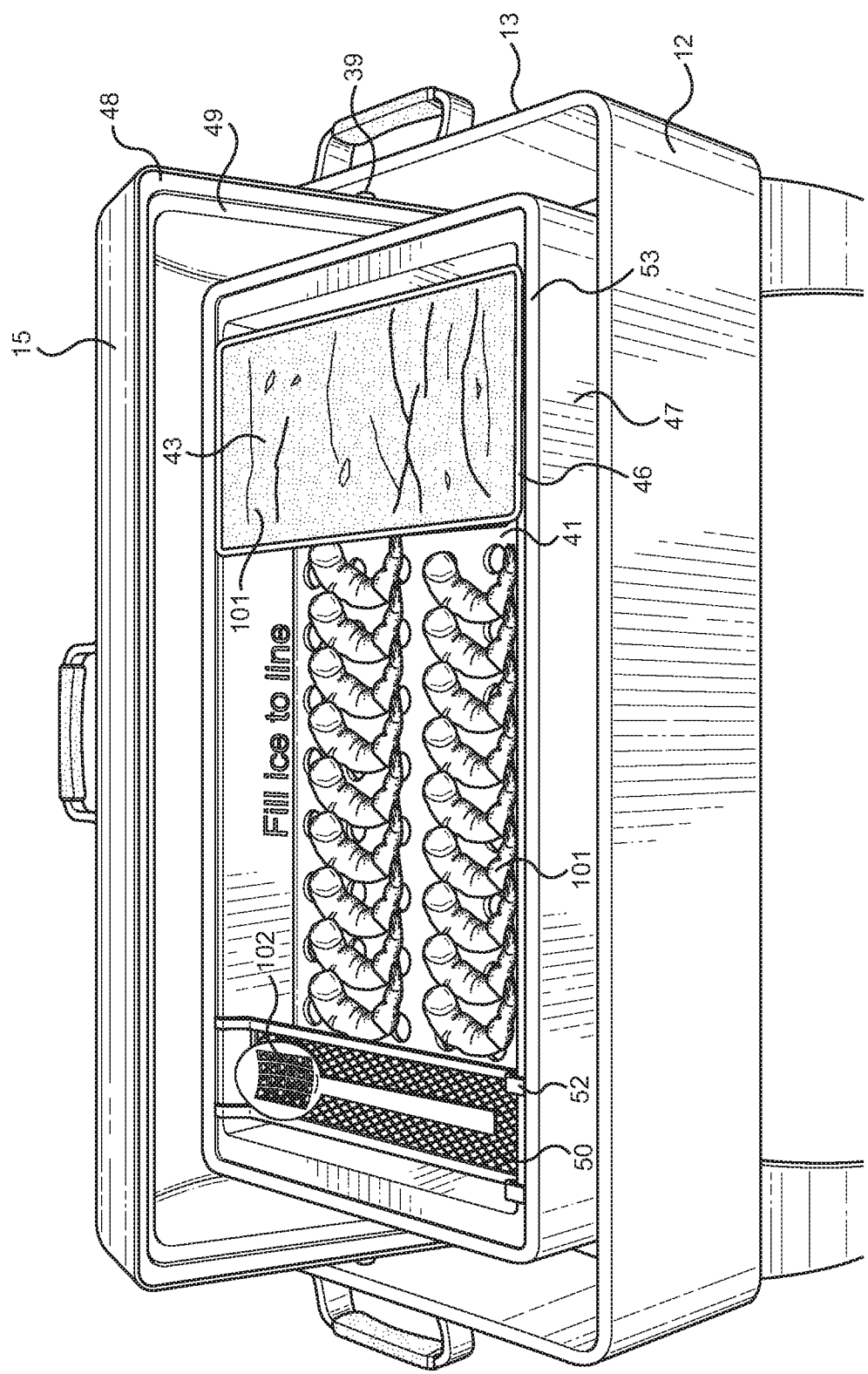
FIG. 4 shows a perspective view of the insulated serving dish in use.

Referring now to FIG. 4, a perspective view of the insulated serving dish in use. The lid 15 is shown rotated about the pivot point 39 to an open position, allowing access to the food stored within the container 30. The serving dish further comprises utensil trays 50 for storing serving utensils 102 therein. The utensil trays include tabs 52 that rest on the upper edge 53 of the container 30, in the same way that the flange 46 of the food tray 43 rests on the upper edge 53 of the container 30. The support tray 41 may also be utilized to support food 101 thereon, particularly food 101 that must be kept closer to the ice within the container 30 to maintain an especially cool temperature.

In the shown embodiment, the lid 15 comprises an inner insulating layer 49 and outer waterproof layer 48. In this way, the lid provides additional insulative properties to the serving dish. When the lid 15 is rotated to a closed position, the food and ice stored within the container 30 are surrounded by an insulated enclosure, which maintains the cool temperature within the container 30. This allows the food 101 to be kept cool before and during serving.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A serving dish, comprising:
   a housing having a plurality of peripheral sidewalls extending vertically therefrom forming an interior volume;
   the housing having a pair of housing handles disposed on an opposing pair of peripheral sidewalls thereof;
   a container disposed within the interior volume of the housing, the container comprising a container base and plurality of container sidewalls extending vertically therefrom forming a container volume;
   a support tray having a plurality of apertures thereon, wherein the support tray is removably received within the container volume;
   the support tray having a pair of support tray handles extending upward from a top surface of the support tray, the support tray handles being inset from a perimeter of the support tray;
   a food tray comprising a planar base, a plurality of food tray sidewalls extending therefrom forming a food tray volume, and a flange disposed on an upper edge of the food tray sidewalls, wherein the flange supports the food tray on an upper edge of the container sidewalls such that the food tray volume occupies a portion of the container volume;
   a channel formed between the housing peripheral sidewalls and the container sidewalls; and
   a lid comprising opposing semicircular sidewalls and an arcuate upper surface, and an open lower end forming an open half cylinder, wherein a lower edge of the lid selectively occupies the channel formed between the housing peripheral sidewalls and the container sidewalls, the lid configured to selectively enclose the container volume;
   wherein the lid comprises a lid handle centrally disposed on an external surface thereof.

2. The serving dish of claim 1, wherein the lid and the container each comprise a waterproof outer layer and an insulative inner layer.

3. The serving dish of claim 1, wherein the lid is supported by the housing, wherein the lid is configured to be selectively removed therefrom.

4. The serving dish of claim 1, wherein the lid is pivotally attached to the container and movable between a closed position and an open position.

5. The serving dish of claim 1, further comprising a temperature gauge disposed on an exterior of the lid, wherein the temperature gauge comprises a thermometer configured to measure and display the temperature within the container.

6. The serving dish of claim 1, wherein the container base comprises a plurality of downward sloping panels, wherein the downward sloping panels converge at a lowermost centerpoint having a drain disposed thereon.

7. The serving dish of claim 6, wherein the drain comprises a removable cap thereon, wherein the removal of the cap permits liquid to flow out of the container volume through the drain.

8. The serving dish of claim 1, further comprising a plurality of legs disposed an underside of the housing extending downward therefrom.

9. The serving dish of claim 1, wherein each leg of the plurality of legs comprises:
   an upper member forming an obtuse angle with respect to the underside of the housing;
   a lower member extending vertically downward from the upper member; and
   a foot member disposed on the lower member, wherein the foot member is perpendicular thereto.

10. The serving dish of claim 1, wherein each of the apertures of the support tray are equidistant from one another.

11. The serving dish of claim 1, further comprising a groove extending from an interior surface of the plurality of container sidewalls.

12. The serving dish of claim 11, further comprising an indicium disposed on an interior surface of the plurality of container sidewalls, wherein the indicium is configured to designate the groove as a designated ice level with which the container is filled with ice when used.

13. The serving dish of claim 1, wherein the lid handle is centrally disposed on a top portion of an external surface of the lid.

14. The serving dish of claim 1, wherein the container comprises a projection disposed internally around an entire perimeter of the container extending inwardly, the projection configured to removably receive the support tray.

15. The serving dish of claim 14, wherein the projection is placed to act as a fill marker configured to identify a proper amount of ice to place in the container.

* * * * *